United States Patent
Antonopoulos

(10) Patent No.: US 10,559,862 B2
(45) Date of Patent: Feb. 11, 2020

(54) METHOD OF FORMING A NEGATIVE ELECTRODE FOR A LITHIUM-ION CELL

(71) Applicant: Bayerische Motoren Werke Aktiengesellschaft, Munich (DE)

(72) Inventor: Byron Konstantinos Antonopoulos, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 153 days.

(21) Appl. No.: 15/862,792

(22) Filed: Jan. 5, 2018

(65) Prior Publication Data

US 2018/0131045 A1    May 10, 2018

Related U.S. Application Data

(63) Continuation of application No. PCT/EP2016/064944, filed on Jun. 28, 2016.

(30) Foreign Application Priority Data

Jul. 6, 2015   (DE) .................... 10 2015 212 591

(51) Int. Cl.
*H01M 10/44*   (2006.01)
*H01M 4/38*    (2006.01)
(Continued)

(52) U.S. Cl.
CPC ......... *H01M 10/44* (2013.01); *H01M 4/0428* (2013.01); *H01M 4/0447* (2013.01);
(Continued)

(58) Field of Classification Search
CPC ............ H02J 7/007; H02J 7/04; H02J 7/0075; H01M 4/02
(Continued)

(56) References Cited

U.S. PATENT DOCUMENTS

2010/0148731 A1   6/2010 Notten et al.
2011/0037439 A1   2/2011 Bhardwaj et al.
(Continued)

FOREIGN PATENT DOCUMENTS

JP   2001-176560 A   6/2001
JP   2004-228010 A   8/2004
(Continued)

OTHER PUBLICATIONS

International Search Report (PCT/ISA/210) issued in PCT Application No. PCT/EP2016/064944 dated Aug. 3, 2016 with English translation (Four (4) pages).
(Continued)

*Primary Examiner* — Edward Tso
(74) *Attorney, Agent, or Firm* — Crowell & Moring LLP

(57) ABSTRACT

A method is provided for forming a negative electrode for a lithium-ion cell. The method include the steps of: carrying out first constant-current charging with a first charging current until a first half-cell potential with regard to a reference electrode is reached; carrying out first constant-voltage charging at the first half-cell potential with regard to the reference electrode until a second charging current is reached; carrying out AC voltage excitation or alternating current excitation over a frequency time period; carrying out second constant-current charging with a third charging current until a second half-cell potential with regard to the reference electrode is reached; and carrying out second constant-voltage charging at the second half-cell potential with regard to the reference electrode until a final charging current is reached or until a maximum constant-voltage charging duration is reached.

16 Claims, 3 Drawing Sheets

(51) Int. Cl.
  *H01M 10/52* (2006.01)
  *H01M 4/04* (2006.01)
  *H02J 7/00* (2006.01)
  *H01M 4/13* (2010.01)
  *H01M 4/587* (2010.01)

(52) U.S. Cl.
  CPC ........... *H01M 4/382* (2013.01); *H01M 10/52* (2013.01); *H02J 7/007* (2013.01); *H01M 4/13* (2013.01); *H01M 4/587* (2013.01)

(58) Field of Classification Search
  USPC ..... 320/124, 125, 130, 131, 160; 429/231.9, 429/231.95
  See application file for complete search history.

(56) References Cited

U.S. PATENT DOCUMENTS

| | | | |
|---|---|---|---|
| 2013/0043843 A1 | 2/2013 | Amiruddin et al. | |
| 2014/0084849 A1 | 3/2014 | Lee et al. | |
| 2014/0255796 A1 | 9/2014 | Matsuoka et al. | |
| 2015/0060290 A1 | 3/2015 | Xu | |
| 2015/0357678 A1* | 12/2015 | Tsubouchi | H01M 10/0525 429/200 |

FOREIGN PATENT DOCUMENTS

| | | |
|---|---|---|
| JP | 2011-108550 A | 6/2011 |
| JP | 2012-227035 A | 11/2012 |
| JP | 2014-232704 A | 12/2014 |
| WO | WO 2008/154956 A1 | 12/2008 |
| WO | WO 2013/062056 A1 | 5/2013 |

OTHER PUBLICATIONS

German-language Written Opinion (PCT/ISA/237) issued in PCT Application No. PCT/EP2016/064944 dated Aug. 3, 2016 (Six (6) pages).
German-language Search Report issued in counterpart German Application No. 10 2015 212 591.2 dated Mar. 10, 2016 with partial English translation (Twelve (12) pages).
International Search Report (PCT/ISA/210) issued in PCT Application No. PCT/EP2016/064935 dated Aug. 3, 2016 with English translation (Four (4) pages).
German-language Written Opinion (PCT/ISA/237) issued in PCT Application No. PCT/EP2016/064935 dated Aug. 3, 2016 (Six (6) pages).
German-language Search Report issued in counterpart German Application No. 10 2015 212 590.4 dated Mar. 10, 2016 with partial English translation (Thirteen (13) pages).
Andre et al., "Future Generations of Cathode Materials: an Automotive Industry Perspective", Journal of Materials Chemistry A, Feb. 9, 2015 (24 pages).
Abraham et al., "Performance Degradation of High-Power Lithium-Ion Cells—Electrochemistry of Harvested Electrodes", Journal of Power Sources, 2007, pp. 465-475, vol. 170.
Vetter et al., "Ageing Mechanisms in Lithium-Ion Batteries", Journal of Power Sources, 2005, pp. 269-281, vol. 147.
Japanese-language Office Action issued in counterpart Japanese Application No. 2017-568251 dated Nov. 13, 2019 with English translation (13 pages).

* cited by examiner

METHOD OF FORMING A NEGATIVE ELECTRODE FOR A LITHIUM-ION CELL

CROSS REFERENCE TO RELATED APPLICATIONS

This application is a continuation of PCT International Application No. PCT/EP2016/064944, filed Jun. 28, 2016, which claims priority under 35 U.S.C. § 119 from German Patent Application No. 10 2015 212 591.2, filed Jul. 6, 2015, the entire disclosures of which are herein expressly incorporated by reference.

This application contains subject matter related to U.S. application Ser. No. 15/862,798, entitled "Rapid Forming of an Electrode" filed on even date herewith.

BACKGROUND AND SUMMARY OF THE INVENTION

The invention relates to a method for forming a negative electrode for a lithium ion cell.

The interface between the negative electrode and the electrolyte in a lithium-ion cell has a critical influence upon the properties and behavior of the cell. A layer forms on the negative electrode, the "SEI layer" (or "solid electrolyte interphase"). This surface layer forms upon the initial charging of the cell, which is also described as forming or formation. During initial charging, the formation of the SEI surface layer proceeds in tandem with the intercalation of lithium ions in graphite (in the case of a graphite anode employed as a negative electrode). The precise forming conditions are critical to the formation of the SEI surface layer. In addition to the selection of chemical components such as, e.g. electrolytes, the properties of the surface layer such as, for example, permeability to lithium ions or the stability of the surface layer, and thus the ageing behavior of the entire cell, are dependent upon these conditions. In order to obtain the most advantageous properties of the surface layer possible, according to the prior art, forming proceeds with a low current input. A time-efficient forming profile proceeds, for example, from document US 20150060290 A1.

One object of the invention is the disclosure of an improved method for forming a negative electrode for a lithium-ion cell.

This and other objects are achieved by a method for forming a negative electrode for a lithium-ion cell, comprising the steps of: first constant-current charging with a first charging current until a first half-cell potential with regard to a reference electrode is reached; first constant-voltage charging at the first half-cell potential with regard to the reference electrode until a second charging current is reached; AC voltage excitation or alternating current excitation over a frequency time period; second constant-current charging with a third charging current until a second half-cell potential with regard to the reference electrode is reached; and second constant-voltage charging at the second half-cell potential with regard to the reference electrode until a final charging current is reached, or until a maximum constant-voltage charging duration is reached.

According to the invention, a first constant-current charging proceeds with a first charging current until a first half-cell potential with regard to a reference electrode is reached. A first constant-voltage charging further proceeds at the first half-cell potential with regard to the reference electrode until a second charging current is reached. AC voltage excitation or alternating current excitation further proceeds over a frequency time period. A second constant-current charging further proceeds with a third charging current until a second half-cell potential with regard to the reference electrode is reached. And, a second constant-voltage charging further proceeds at the second half-cell potential with regard to the reference electrode until a final charging current is reached, or until a maximum constant-voltage charging duration is reached.

A forming method is thus disclosed, which comprises the above-mentioned forming steps. The effects of these forming steps interact, such that advantageous impacts are achieved in the constitution of an SEI (solid electrolyte interphase) surface layer on the negative electrode. The method is applicable to a graphite electrode or a similar negative electrode (e.g. a silicon-graphite composite).

By the action of first constant-current charging, a first surface layer of preferred chemical composition is constituted.

By the action of first constant-voltage charging, the surface layer components formed during first constant-current charging are fully-constituted, through to passivation. Accordingly, only components are formed, the preceding formation reactions of which, at a corresponding half-cell potential with regard to a reference electrode, are thermodynamically possible.

By the action of AC voltage or alternating current excitation, the existing surface layer undergoes chemical and/or physical changes.

By the action of second constant-current charging, a surface layer of a second type and a different chemical composition is formed, inter alia as a result of breakdown reactions of the first surface layer. Herein, as a result of the lower half-cell potential with regard to a reference electrode, reactions are made possible which were not possible during the first constant-current charging and constant-voltage charging.

By the action of second constant-voltage charging, the surface layer components formed during second constant-current charging are fully-constituted, through to passivation.

By means of AC voltage or alternating current excitation, an SEI layer is obtained which is exceptionally elastic and durable, and shows good permeability to lithium ions, i.e. has a limited penetration resistance to lithium ions at a low thickness. This is explained by the reorientation and/or restructuring of the existing surface layer components during AC voltage excitation or alternating current excitation. The surface layer constituted during second constant-current charging and constant-voltage charging is thus advantageous, with respect to the properties specified.

The individual forming steps proceed in temporal succession in the sequence indicated, but not necessarily in immediate succession. Specifically, further steps, such as for example individual relaxation phases, can be executed between individual forming steps.

It is, for example, advantageous if a resting voltage phase, over a relaxation time interval, is executed after the first constant-voltage charging and prior to AC voltage excitation or alternating current excitation.

The resting phase permits the completion of diffusive equalization processes, i.e. the achievement of localized equilibria in the concentration of the reagents involved in formation.

According to a further variant of the invention, the first charging current lies within a range of one hundredth to two times the one-hour discharging current.

The first charging current thus assumes a constant value, which lies between one hundredth and two times the 1-hour current. The one-hour current, 1 C, is the current which, within 1 hour under nominal conditions, is tapped for the charging of the cell to its rated capacity. Multiples of this one-hour current are described as C-rates. Accordingly, the first charging current is 0.01 C to 2 C.

It is, moreover, advantageous if the first half-cell potential lies within a range of 500 mV to 1,200 mV, with respect to a Li/Li$^+$ reference electrode. First constant-current charging thus proceeds until the achievement of this potential value with regard to the Li/Li$^+$ reference electrode, i.e. until the voltage falls to this potential, in order to maintain the first charging current. At this potential, potentiostatic charging proceeds, until the second charging current is achieved.

The Li/Li$^+$ electrode is provided as a reference electrode. At an electrical potential of approximately 500 mV to approximately 1,200 mV with respect to this electrode, a first reaction step proceeds for the formation of the SEI layer. This step continues until, at an equal potential, i.e. with a reducing current, the second charging current is achieved.

The second charging current is therefore smaller than the first charging current.

Moreover, a relaxation time interval of at least one minute is advantageous. During this time interval, diffusion processes equalize the concentration gradients of components which are involved in the reaction, in order to ensure that sufficient reagents are available for AC voltage or alternating current excitation.

According to a specifically preferred form of embodiment of the invention, AC voltage excitation or alternating current excitation proceeds at a constant frequency. This constant frequency assumes a value which lies within a band width of 0.001 kHz to 1,000 kHz.

The amplitude of AC voltage excitation ranges from approximately 0.1 mV to 50 mV around the value of the load-free potential, i.e. the open-circuit potential (OCP), also described as the no-load potential. Excitation is oscillating, preferably sinusoidal, or involves the simplest possible superimposition of circular functions.

According to a further variant of the invention, AC voltage excitation or alternating current excitation involves sequential or superimposed excitation at at least two frequencies, or excitation in the form of a frequency sweep.

Alternatively, a plurality of frequencies can thus be employed sequentially or by superimposition for the purposes of excitation, or a frequency sweep can be executed. The plurality of frequencies and the frequency sweep respectively lie within a frequency band of 0.001 kHz to 1,000 kHz.

AC voltage excitation proceeds over a frequency time interval, which lies within the range of 0.01 seconds to 120 minutes, but is at least of sufficient duration such that, even at a low excitation frequency, at least 10 oscillations are completed.

After frequency excitation, second constant-current charging is preferably executed, wherein the third charging current lies within a range of one hundredth to two times the one-hour current. This charging step preferably proceeds until the achievement of the second half-cell potential to a value of 5 mV to 300 mV with regard to a Li/Li$^+$ reference electrode. If the potential has fallen to this value, second constant-voltage charging proceeds until the charging current has also fallen to the final charging current which, in turn, is smaller than the third charging current. However, second constant-voltage charging proceeds over a time interval of at least one minute.

The half-cell, i.e. the negative electrode, is thus initially charged, and the SEI layer is advantageously constituted.

The invention is based upon the considerations set out below.

In addition to active materials (on the negative and positive electrodes, also described as the anode and cathode), lithium-ion batteries (LIB) also contain electrolytes, comprised of a conductive salt or salts, solvents and additives. Electrolytes, of the type employed in the prior art, are typically comprised of a mixture of ethylene carbonate (EC) and linear carbonates, such as diethyl carbonate (DEC), dimethyl carbonate (DMC) and/or ethylmethyl carbonate (EMC). These are then combined with further additives, such as e.g. vinyl carbonates (VC) in small concentrations, and the conductive salt lithium hexafluorophosphate (LiPF6).

In order to achieve the maximum possible total voltage in LIBs, materials are employed for the negative electrode, the thermodynamically-dictated electrochemical potential of which is very low (<1 V with respect to Li/Li$^+$). The potential range within which the negative electrode is operated (charged and discharged) lies significantly below the electrochemical stability window of the electrolyte, as a result of which the latter is electrochemically reduced on the negative electrode.

By the use of appropriate solvent constituents, and specifically by the addition of the specific above-mentioned additives, the electrolyte reduction can be passivated, as the reduction products themselves are electrically insulating, and the transfer of electrons from the electrode to the electrolyte is thus inhibited. If the reduction products nevertheless show ionic conductivity, with respect to the migration and diffusion of lithium ions, the desired reversible reaction of lithium on the electrode can still take place. As the reduction products form a non-negligible thin layer on the negative electrode, reference is made to a solid electrolyte interphase (SEI).

In an ideal case, the SEI is a durable, cycle-resistant electrical insulator and ionic conductor. In reality, as a result of its restrictive ionic conductivity, the SEI constitutes an ohmic resistance, associated with the inhibited movement of lithium ions. Resistances of this type reduce both the power density and the energy efficiency of LIBs (lithium-ion batteries, constituted of lithium ion cells).

In order to restrict these effects to the greatest possible extent, in addition to the use of electrolyte additives, reduction reactions must additionally proceed in a controlled manner. Chemical and physical properties of the SEI can be controlled accordingly. The controlled reduction of the electrolyte is described as forming or formation. According to the current state of the art, LIBs are formed at a specified temperature, with a low current input, wherein relaxation time intervals are incorporated in the interim.

Although the SEI passivates the electrolyte reduction at higher potentials, reduction products of the first type also react on the electrode, as a result of which the SEI grows from the inside out. The physical morphology of reaction products of the first type on the electrode is critical to the homogeneity and chemical composition of the SEI of the second type, which then remains or develops further over the entire life cycle of the electrode. By the application of forming protocols applied to date, the morphology of the SEI of the first type cannot be influenced, and the impedance of the SEI of the second type cannot be reduced.

As a measure, it is proposed that, by the application of high-frequency electrochemical excitation of the LIB at appropriate time points during formation, the morphology of the SEI of the first type, which is primarily comprised of organic species, is influenced such that the (specifically real) impedance is reduced. To this end, it must be established at what voltage or at what potential the SEI of the first type is definitively constituted and passivated. Then, by means of high-frequency excitation, of the type e.g. in electrochemical impedance spectroscopy (EIS), the polar organic layer can be physically manipulated, in order to achieve the selective organization of a further reduction to inorganic species (e.g. carbonate, fluoride, oxide; $Li_2CO_3$, LiF, $Li_2O$), thereby exploiting the different ionic conductivity thereof.

By the forming of a good ionically-conductive and elastic SEI, impedances in the LIB can be reduced, and the long-term stability of the SEI achieved. As a direct result, power density and energy efficiency are improved and, indirectly, the energy density and the service life of a LIB are also improved accordingly.

The potential profile of a carbon anode during galvanostatic (at a constant current) and thereafter potentiostatic (at a constant voltage) lithiation is characterized by a plurality of lithiation stages. If a cell of this type, during forming, undergoes 50 EIS measurements at an appropriate point, this results in a falling overall impedance (both actual and notional), in comparison with an anode of this type with no EIS measurement. During EIS, frequencies of 500 kHz to 1 Hz are swept. In a high-frequency EIS-treated anode (EIS anode), the potential during subsequent further forming, with regard to the reference electrode $Li/Li^+$, is higher than in the case of a non-high-frequency EIS-treated anode (standard anode). This shows that, at an equal current, i.e. in the galvanostatic range, further to EIS-treatment, a lower overpotential (in the direction of smaller potentials) is required on the negative electrode. At potentials from approximately <0.5 V, with regard to $Li/Li^+$, lithium is incorporated in the microcrystalline graphite. Thus, in an EIS anode, further to EIS, a less substantial potential reduction is required in order to maintain the same charging current as in the case of a standard anode, in a comparable forming stage. As there has been no electrochemical change in the reaction, the lower drop in potential is caused by a lower ohmic resistance. As a logical consequence, this results in the earlier achievement of the final potential during lithiation. A higher capacity can be tapped from the EIS anode and, moreover, the latter can be passivated in a shorter time, thereby reinforcing the superior performance of the cell.

Other objects, advantages and novel features of the present invention will become apparent from the following detailed description of one or more preferred embodiments when considered in conjunction with the accompanying drawings.

Fig, 3 is a flow chart illustrating an exemplary method of forming a negative electrode according to the invention.

DETAILED DESCRIPTION OF THE DRAWINGS

Figure 1:
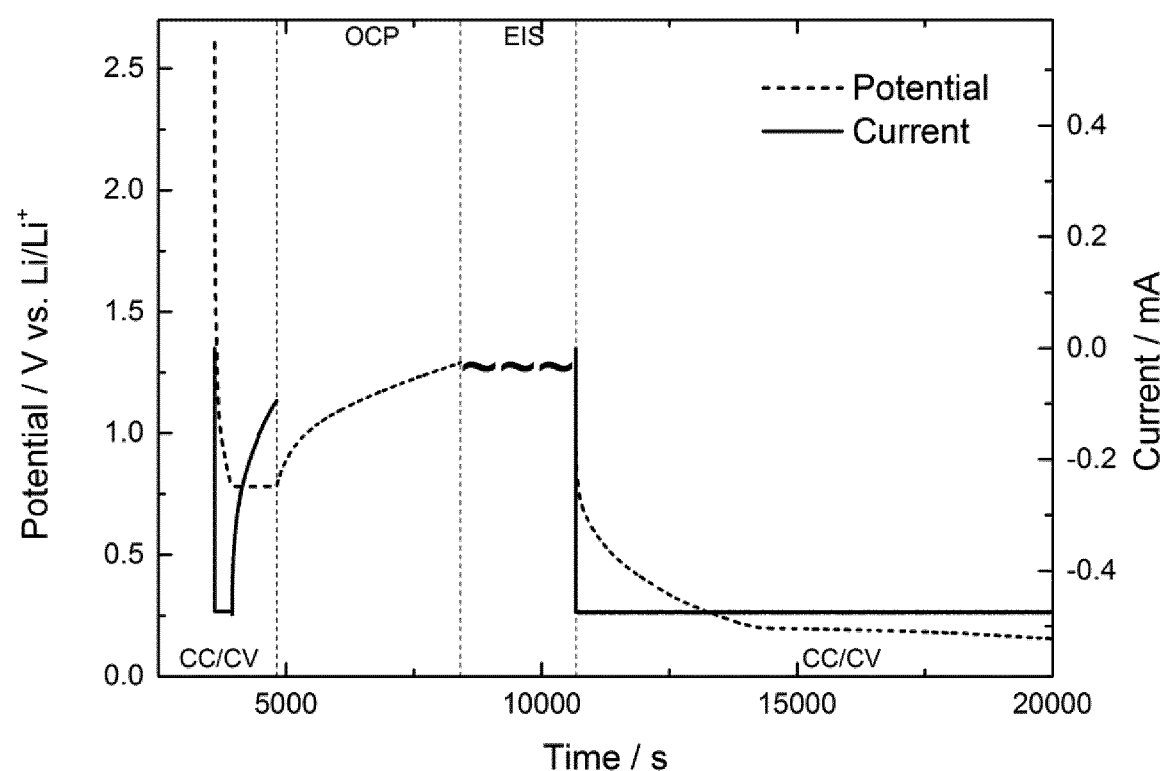
FIG. 1 represents a forming profile according to the invention: potential and current characteristics of the anodic half-cell.

FIG. 1 shows one form of embodiment of the forming method according to the invention. The potential of the graphite electrode with regard to the $Li/Li^+$ reference electrode and against the time on the x-axis (the dashed line on the left y-axis) is shown. Additionally, the current is represented as a solid line on the right y-axis, wherein a negative current signifies a charging current, i.e. the formation or incorporation of lithium.

Figure 3:
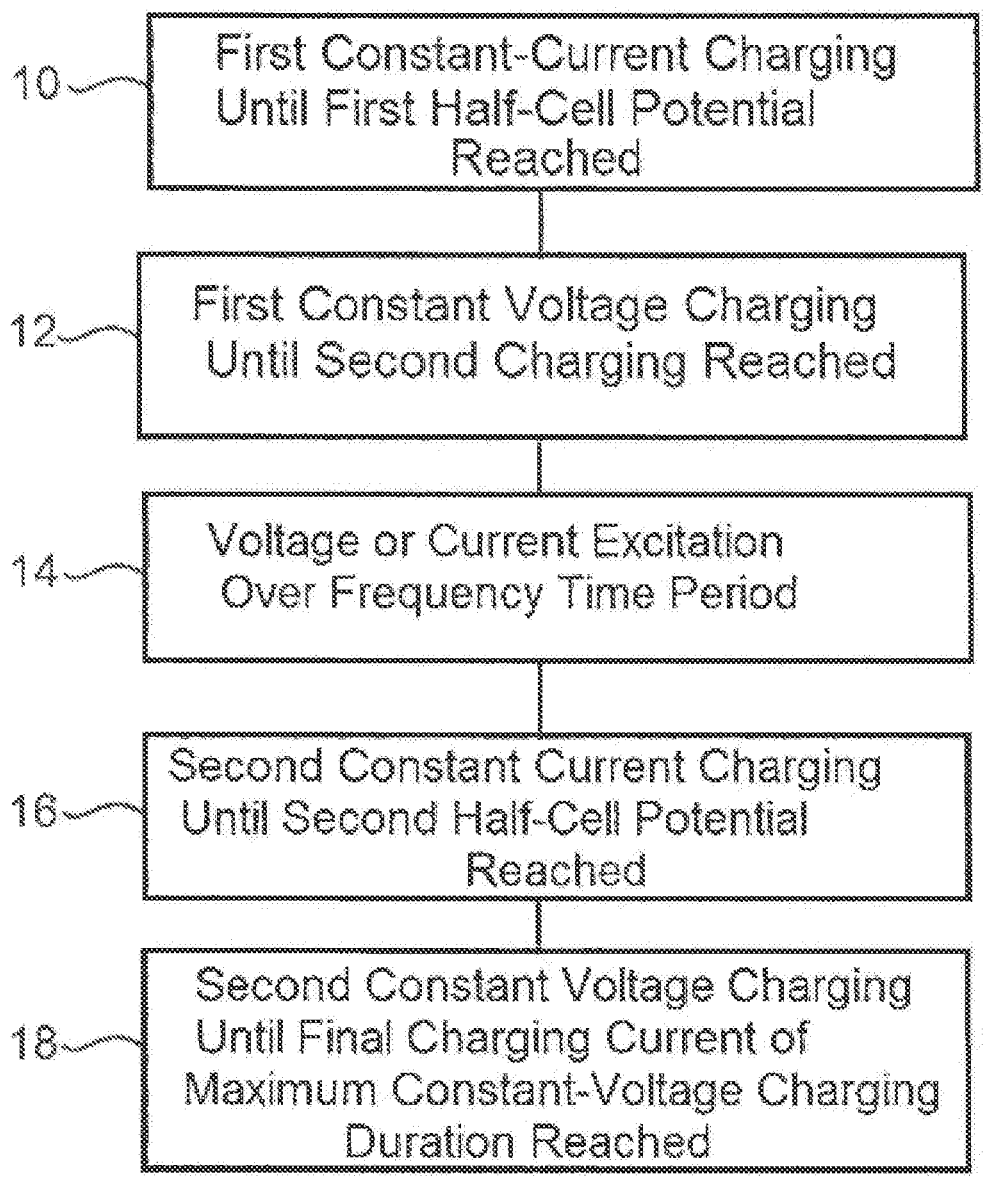

The forming method, according to this form of embodiment, commences with charging at a constant current ("CC") of 0.1C, wherein 1C corresponds to the one-hour current of the half-cell (step 10, FIG. 3). The cut-off criterion is the falling of the voltage to 780 mV. Potentiostatic charging ("CV", or "constant voltage") then commences at this potential, until the current drops to 0.02C (step 12. FIG. 3). This is followed by a resting pause of 60 minutes, during which the open-circuit potential of the electrode (or "OCP") increases to an equilibrium value which has not been entirely achieved during the 60 minutes.

Thereafter, the electrode is excited over a period of 4,400 seconds by AC voltage excitation ("EIS" or "electrochemical impedance spectrum") at an amplitude of 10mV around the value of the open-circuit voltage (step 14. FIG. 3). 55 frequencies are applied respectively for 1.6 seconds, respectively declining with a logarithmic distribution in the frequency band from 500 kHz to 1 Hz. A sweep of this type, of 88 seconds' duration, is repeated 50 times.

Thereafter, further galvanostatic charging is applied ("CC") at 0.1C, until the falling potential achieves a value of 20 mV (step 16, FIG. 3). Finally, potentiostatic charging at 20 mV is applied for 60 minutes (step 18. FIG. 3). All these steps are based upon conditions at room temperature.

Figure 2:
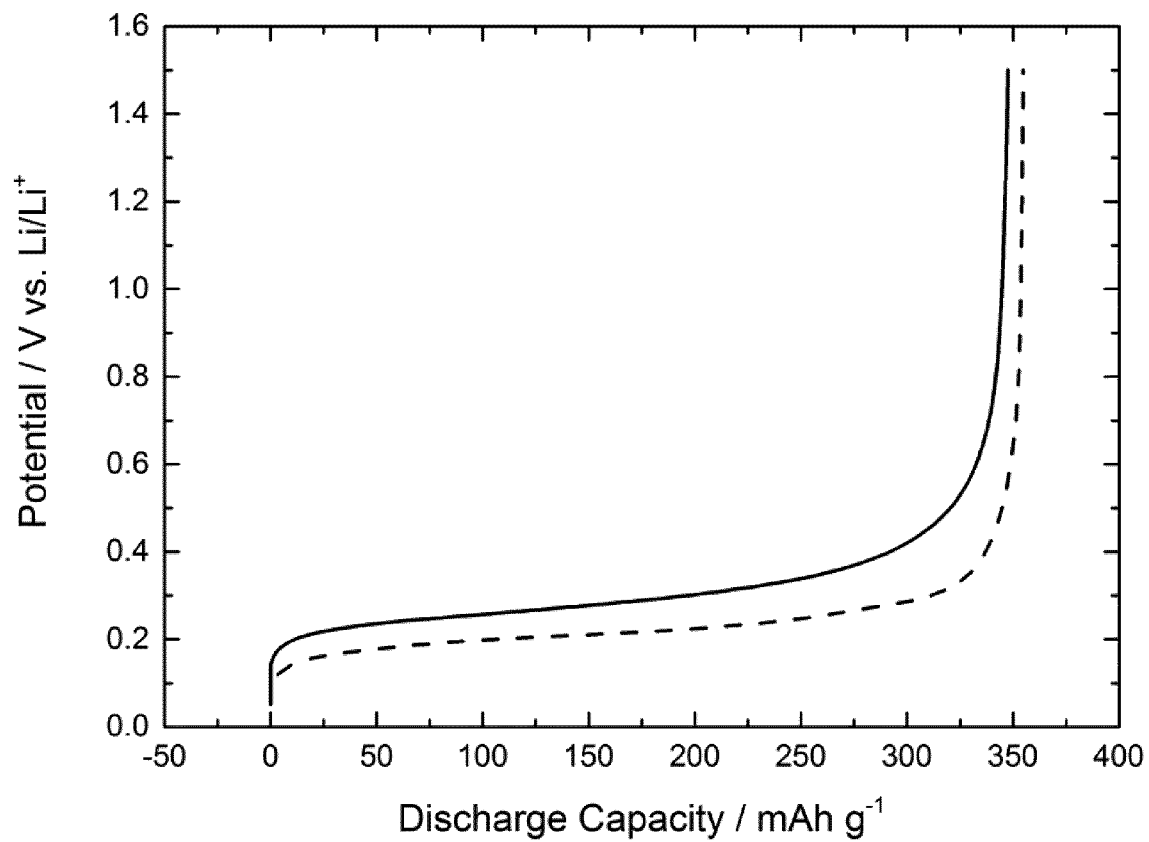
FIG. 2 represents the potential profile during the delithiation of two differently-formed anodes. A graphite electrode is assumed as the negative electrode. The $Li/Li^+$ electrode serves as the reference electrode.

FIG. 2 represents the characteristic discharge curve of a negative electrode formed according to this exemplary embodiment (dashed line), plotted against the weight-specific discharge capacity. The potential characteristic of a negative electrode formed according to the prior art is represented by a solid line. It will be seen that the potential with regard to the $Li/Li^+$ electrode in a negative electrode formed according to the present exemplary embodiment, at a respectively equal discharge rate, rises with a less steep gradient than in the negative electrode formed according to the prior art. By the use of such an electrode (anode) in a lithium-ion battery, a greater potential difference to the positive electrode (cathode) is thus maintained with respect to the discharge capacity. Accordingly, a higher electrical discharge rating is achieved. As a result of the reduced voltage losses, both the charging capacity tapped and the level of energy efficiency are improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for forming a negative electrode for a lithium-ion cell, comprising the steps of:

first constant-current charging with a first charging current until a first half-cell potential with regard to a reference electrode is reached;

first constant-voltage charging at the first half-cell potential with regard to the reference electrode until a second charging current is reached;

AC voltage excitation or alternating current excitation over a frequency time period;

second constant-current charging with a third charging current until a second half-cell potential with regard to the reference electrode is reached; and second constant-voltage charging at the second half-cell potential with regard to the reference electrode until a final charging current is reached, or until a maximum constant-voltage charging duration is reached.

2. The method as claimed in claim 1, wherein a resting voltage phase, over a relaxation time interval, is executed after the first constant-voltage charging and prior to AC voltage excitation or alternating current excitation.

3. The method as claimed in claim 1, wherein the first charging current lies within a range of one hundredth to two times the one-hour current.

4. The method as claimed in claim 1, wherein the first half-cell potential lies within a range of 500 mV to 1,200 mV, with respect to a Li/Li+ reference electrode.

5. The method according to claim 1, wherein the second charging current is smaller than the first charging current.

6. The method as claimed in claim 2, wherein the relaxation time interval is at least one minute.

7. The method as claimed in claim 1, wherein the AC voltage excitation or alternating current excitation proceeds at a constant frequency.

8. The method as claimed in claim 7, wherein the constant frequency lies within a range of 0.001 kHz to 1,000 kHz.

9. The method as claimed in claim 1, wherein the AC voltage excitation or alternating current excitation involves sequential excitation at at least two frequencies, or excitation in the form of a frequency sweep.

10. The method as claimed in claim 9, wherein each frequency of the at least two frequencies or the frequency sweep lies within a range of 0.001 kHz to 1,000 kHz.

11. The method as claimed in claim 7, wherein the frequency time period lies within the range of 0.01 seconds to 120 minutes.

12. The method as claimed in claim 9, wherein the frequency time period lies within the range of 0.01 seconds to 120 minutes.

13. The method as claimed in claim 1, wherein the third charging current lies within a range of one hundredth to two times the one-hour current.

14. The method as claimed in claim 1, wherein the second half-cell potential lies within a range of 5 mV to 300 mV with regard to the Li/Li+ reference electrode.

15. The method as claimed in claim 1, wherein the final charging current is smaller than the third charging current.

16. The method as claimed in claim 1, wherein the maximum constant voltage charging time is at least one minute.

* * * * *